United States Patent [19]

Nickel et al.

[11] 4,420,456
[45] Dec. 13, 1983

[54] MOUNTING OF POWER CONDUCTOR AND INSTRUMENT LEAD PENETRATIONS FOR NUCLEAR REACTOR INSTALLATIONS

[75] Inventors: Walter Nickel, Viernheim; Josef Schoening, Hambruecken; Hans-Georg Schwiers, Ketsch, all of Fed. Rep. of Germany

[73] Assignee: Hochtemperatur-Reaktorbau GmbH, Cologne, Fed. Rep. of Germany

[21] Appl. No.: 256,973

[22] Filed: Apr. 23, 1981

[30] Foreign Application Priority Data

Apr. 23, 1980 [DE] Fed. Rep. of Germany ....... 3015494

[51] Int. Cl.[3] .............................................. G21C 17/00

[52] U.S. Cl. .................................... 376/245; 376/203; 376/463

[58] Field of Search ............... 376/203, 245, 292, 291, 376/463

[56] References Cited

U.S. PATENT DOCUMENTS

| | | | |
|---|---|---|---|
| 2,942,116 | 6/1960 | Axelrad | 376/463 |
| 3,442,760 | 5/1969 | Rigg | 376/463 |
| 3,844,883 | 10/1974 | Bevilacqua et al. | 376/463 |
| 4,046,632 | 9/1977 | Puchelt et al. | 376/203 |
| 4,142,937 | 3/1979 | Eyral et al. | 376/203 |
| 4,235,674 | 11/1980 | Yue | 376/203 |
| 4,328,071 | 5/1982 | Moulin | 376/245 |

*Primary Examiner*—Sal Cangialosi

*Attorney, Agent, or Firm*—Schwartz, Jeffery, Schwaab, Mack, Blumenthal & Koch

[57] ABSTRACT

A mounting for power conductor and instrument lead penetrations in nuclear reactors provides a device that is simple, compact and at the same time easily installed, repaired or replaced. The mounting comprises a cylinder like, stepped housing which is to pass through the pressure vessel wall of the nuclear reactor and house at least one and preferably a plurality of electrical conductors.

15 Claims, 1 Drawing Figure

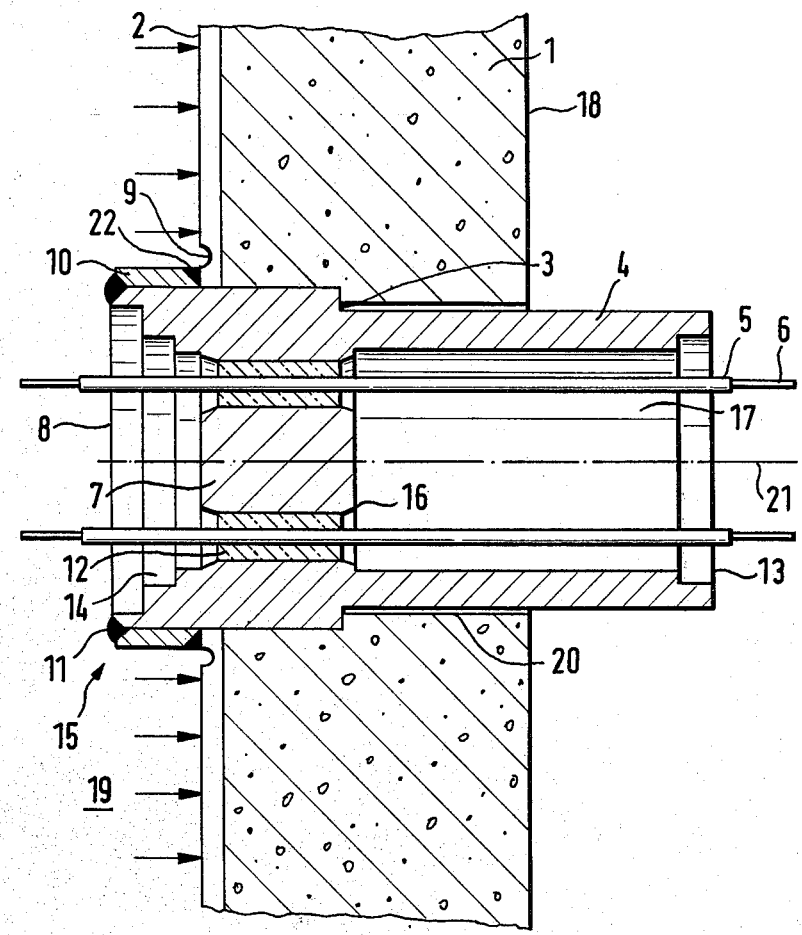

MOUNTING OF POWER CONDUCTOR AND INSTRUMENT LEAD PENETRATIONS FOR NUCLEAR REACTOR INSTALLATIONS

BACKGROUND OF THE INVENTION

1. Field of the Invention

The invention concerns a mounting arrangement or device for carrying power conductors and instrument leads through the walls and barriers in nuclear reactor installations. More particularly, the mounting device provides a means for the penetration of the power conductor and instrument leads into a nuclear reactor pressure vessel.

2. Background of the Prior Art

In nuclear reactor installations, a controlled and self-perpetuating chain reaction is maintained in a limited and defined space. The radioactive elements and the radiation therefrom are inseparable components of such chain reactions. Protection of any biological matter is, therefore, necessary in the environment of a nuclear reactor. The intensity of the radiation generated and its localization, is reduced to the extent possible, to the area of activity of the self-perpetuating chain reaction. This is accomplished by means of a steel and concrete layer of the concrete vessel constructed surrounding the reactor for this purpose. The process of nuclear fission within the reactor vessel and its conversion to heat energy is under the surveillance of instruments during the entire operating period of the reactor. The instruments are monitored and controlled from outside the vessel.

Devices for electric conductors penetrating into and connecting the internal activated area, wherein the measuring and surveillance instruments are arranged with the unactivated area are known. These penetration devices are usually arranged in an orifice provided in the concrete jacket of the reactor vessel. The orifice is lined with an armor tube. The devices are designed so that the replacement of the concrete layer by the device does not result in an additional increase in radiation exposure outside the concrete vessel. This is achieved by equipping the penetration device with materials assuring an adequate reduction in radiation intensity. The materials intended for the shielding of radiation are laid out in the form of separate layers in a tubular housing and are equipped with electrical conductors extending through the entire housing and connecting the two spaces.

In a known device, the one end of the housing arranged on the inner wall of the housing is fastened with screws or bolts to the vessel wall flush with the plane of the wall.

Known penetration devices of this type have the disadvantage that they consist of relatively numerous special, individual parts. The need for specially manufactured parts unfavorably affects the cost of manufacturing. The repair work, elimination or replacement of these devices often necessary when these devices are damaged is associated with substantial complications. This is because maintenance work controlled from the outside cannot be easily performed on penetration devices of this type.

SUMMARY OF THE INVENTION

It is an object of the invention to provide a mounting device for power conductor and instrument lead penetrations for a nuclear reactor installation. The mounting devices of the instant invention substantially eliminate the aforementioned difficulties and are simple in their design.

The objects and advantages of the invention are attained according to the invention by means of a cylinder-like, stepped housing penetrating the pressure vessel wall of the nuclear reactor and receiving the electrical conductors.

The invention operates in the following fashion. An opening or a penetration into a shielding wall and having a diameter relatively small compared to the thickness of the wall acts as a collimator of the radiation capable of escaping through the orifice. Collimated radiation is shielded, however, in a relatively simple manner by means of radiation protection measures such as a shield placed perpendicularly to the axis of collimation. In the arrangement of the housing according to the invention, the shielding member such as lead and paraffin is identical with the principal axis of the housing.

In addition to the shield, the location of the penetrator itself can most approximately be placed in an area of the concrete vessel remote to the localitites where reactor personnel work.

The principles of radiation shielding are also combined in the present invention with the principle that a structural part which is under a load can be relieved of the stress acting from either inside or outside. That is, the stress on a structural part can be passed on to the pressure vessel wall.

The mounting device of the present invention is intended for nuclear reactor installations wherein the structural parts arranged within the concrete vessel are exposed to high pressures, temperatures and radioactive radiation. The concrete wall surrounding the reactor itself is several meters thick and the inner wall of the concrete vessel is provided with a steel liner to assure the necessary gas tightness of the vessel. The invention also concerns the combination of the mounting device in the pressure vessel wall.

The dimensioning and external layout of the mounting device of the invention is arranged to apply the shielding principles and stress relief principles to the invention in a simple manner.

The housing of the mounting device is preferably made of steel. The wall of the pressure vessel is provided with a penetration whereby the mounting placed in the wall penetration and the pressure vessel wall surrounding it correspond with each other. As the penetration according to the invention has a shoulder to support the stepped housing, the compression stress acting from the inside outwardly is mainly absorbed at this point and passed on to the wall of the vessel.

Further advantageous embodiments must take into consideration the potential damage to the housing during operation of the nuclear reactor. The mounting device is arranged in an orifice that has a diameter that is larger on the inside of the concrete wall than on the outside. Accordingly, the housing is oriented from the inside out. Part of the housing projects into the inner space of the concrete vessel and is surrounded by a tube segment made of steel. The diameter of the tube segment and the external diameter of the projecting part correspond to each other and the length of the tube segment and of the projecting part are identical. The tube segment is welded to the inner wall of the vessel wall and the other end is joined with the end of the projecting part by mens of lip welding.

In the border zone of the weld joining the tube segment with the wall, a groove is formed for the purpose of keeping the stresses generated by welding as low as possible.

It has been found to be advantageous to provide the inner area of the protruding part of the housing with a recess, whereby the depth of the recess and the length of the protruding part are equal. The recess may preferably be made in the shape of a stepped frustrum of a cone narrowing in the direction of the inside of the housing.

The above-described embodiments are particularly advantageous in the potential damage to the mounting does occur. In such a case, the weld joining the tube segment with the housing may for the sake of simplicity be cut off or ground off and the entire housing may be removed. The newly inserted housing will then be welded to the free end of the remaining tube segment. In addition to the fact that the entire process is significantly free of risk, it is rapid and simple.

The use of the mounting device is to provide a means to support the conductor or conductors that must pass through the vessel wall. The area of the housing extending from the plane of the inner wall of the vessel jacketing is made of a solid material, for example, steel. In this filled-in area, bores with diameters larger than the diameter of the conductor are provided. It is advantageous to jacket the conductor here with glass and thus to separate it from the steel housing. The glass assures adequate insulation and resistance to pressure and temperature.

The advantages attained according to the invention in particular consist of the fact that simple mounting and sealing are possible without restrictions of the function of the housing. The housing makes it possible to arrange within a small space a larger number of conductors and, in the case of damage, it may be replaced in a simple manner.

The nuclear reactor may be any nuclear reactor having a pressure vessel wall that must be penetrated by conductors. An example of such reactor is found in U.S. Pat. No. 4,045,285, the disclosure of which is incorporated herein.

LIST OF REFERENCE SYMBOLS

1—pressure vessel wall
2—inner wall of the pressure vessel wall
3—shoulder
4—cylinder like stepped housing
5—insulation
6—conductor
7—steel
8—beginning of the housing
9—groove
10—tube segment
11—lip weld
12—glass
13—end of housing
14—recess
15—protruding part of housing
16—filler
17—hollow space (cavity)
18—external wall of the pressure vessel
19—internal space of the pressure vessel
20—wall penetration
21—principal axis of the housing
22—weld joint

BRIEF DESCRIPTION OF THE DRAWING

An example of an embodiment of the invention is represented in the drawing:

FIG. 1 illustrates a cross-sectional view of the mounting device in place in the pressure vessel wall of a nuclear reactor.

DETAILED DESCRIPTION OF A PREFERRED EMBODIMENT

FIG. 1 shows a mounting for power conductor and instrument lead penetrations in a nuclear reactor. The mounting device has a cylinder-like, stepped housing 4 passing throug the wall 1 of the pressure vessel of the nuclear reactor and receiving the electrical conductors 6. The cylinder shape of the mounting device is not evident from the side view cross-section of FIG. 1. The housing 4 is made of steel and is oriented from the inside 2 toward the outside of the wall 1 of the vessel. The wall penetration 20 contains a larger exterior diameter in the area closest to the inside of the vessel 2 and has a larger orifice at the inside 2 of the pressure vessel wall 1, than at the outside 18. The housing projects partially into the internal space 19 of the pressure vessel and is here surrounded by a steel tube segment 10. The diameter of the protruding part 15 of the housing 4 and the internal diameter of the tube segment 10 correspond to each other. The lengths of the tube segment 10 and the part 15 are equal. The tube segment 10 is welded to the internal wall 2 of the vessel wall 1, while in the border zone of the weld 22 joining the tube segment 10 with the internal wall 2, a groove 9 is provided. The groove 9 is formed into the internal wall 2 in order to absorb the weld stresses generated in the welded joints. The free end of the tube segment 10 welded to the internal wall 2 and the end of the part 15 of the housing 4 that is protruding, are joined by a lip weld 11 to each other. The wall penetration 20 and the part of the housing 4 associated with it correspond to each other, that is, the wall penetration 20 has a shoulder 3 in the area of the stepped configuration of the housing. A plurality of conductors 6 are arranged in the housing 4. The conductors 6 extend parallel to the principal axis of the housing and are provided with an insulation means 5. The inner area of the projecting part 15 is equipped with a recess 14 which narrows in the direction of the inside of the housing. The depth of the recess 14 and the length of the protruding part 15 of the housing are equal, while the recess 14 has the shape of a stepped partial frustrum of a cone. The area 16 of the housing 4 extending from the plane of the internal wall 2 of the vessel jacket to the shoulder 3 is filled with a solid material, for example, steel 7 and glass 12. The inner space of the housing 4 extending from the shoulder 3 to the termination of the end 13 outside of the vessel is preferably a hollow space.

The above description describes a preferred embodiment of the invention. It is to be understood however, that the invention is not limited to any single embodiment or feature, but should be construed to cover all modifications and alternative embodiments falling within the scope of the invention as defined by the claims which follow.

What is claimed is:

1. A mounting construction for power conductors and instrument leads passing through a wall of a nuclear reactor pressure vessel comprising:

a cylindrical metal housing having a first outer circumference larger than a second outer circumference and a shoulder area between said first and second circumferences, said cylindrical metal housing being tightly fitted along its length and outer circumference in a passageway in said nuclear reactor pressure vessel wall, and terminating with a part of said first outer circumference inside said pressure vessel;

a metal, cylindrical tube segment tightly surrounding said part of the first outer circumference within said pressure vessel and fixedly attached thereto with a lip weld;

at least one electrical conductor extending through the length of said cylindrical metal housing, and solid filler material at least partially filling the space within said cylindrical metal housing.

2. The mounting construction of claim 1, wherein said pressure vessel is a concrete pressure vessel having a steel liner.

3. The mounting construction of claim 1, wherein said pressure vessel is a steel pressure vessel.

4. The mounting construction of claim 1, wherein said cylindrical metal housing is a steel housing.

5. The mounting construction of claim 1, wherein said metal cylindrical tube segment is a steel tube segment fixedly attached to said cylindrical metal housing and said pressure vessel wall by welding.

6. The mounting construction of claim 1, wherein said electrical conductor extends through said cylindrical metal housing parallel to the primary axes of said housing.

7. The mounting construction of claim 1, further comprising insulation surrounding said electrical connector.

8. The mounting construction of claim 1, wherein said solid filler comprises steel, glass or mixtures thereof.

9. The mounting construction of claim 1, wherein said cylindrical metal housing extends outside said passageway outside said pressure vessel and defines a cavity at the internal circumference of said cylindrical metal housing.

10. The mounting construction of claim 5, further comprising a groove in said pressure vessel wall adjacent said welding attaching said cylindrical metal housing and said pressure vessel wall.

11. The mounting construction of claim 1, wherein said cylindrical metal housing defines a recess in the end terminating inside said pressure vessel.

12. The mounting construction of claim 11, wherein said recess extends the length of the part of the cylindrical metal housing inside said pressure vessel.

13. The mounting construction of claim 12, wherein said recess comprises a stepped series of recesses wherein the largest is at the end terminating inside said pressure vessel.

14. The mounting construction of claim 13, wherein said recess is in the shape of a stepped frustrum of a cone.

15. The mounting construction of claim 1, wherein said solid filler material fills the space beginning at a plane parallel to the inner wall of the pressure vessel and extending to a parallel plane dissecting said shoulder area.

* * * * *